United States Patent
Lee et al.

(10) Patent No.: US 10,819,781 B2
(45) Date of Patent: Oct. 27, 2020

(54) DISPLAY DEVICE CONNECTION METHOD FOR RAPIDLY DELIVERING DATA TO PLURALITY OF DISPLAY DEVICES

(71) Applicant: Electronics and Telecommunications Research Institute, Daejeon (KR)

(72) Inventors: Changkyu Lee, Daejeon (KR); Wook Hyun, Sejong-si (KR); Mi Young Huh, Daejeon (KR); Shin Gak Kang, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 109 days.

(21) Appl. No.: 16/166,404

(22) Filed: Oct. 22, 2018

(65) Prior Publication Data
US 2019/0124143 A1    Apr. 25, 2019

(30) Foreign Application Priority Data

Oct. 23, 2017    (KR) .................. 10-2017-0137734
Oct. 2, 2018    (KR) .................. 10-2018-0117728

(51) Int. Cl.
*H04L 29/08*    (2006.01)
*H04N 21/63*    (2011.01)
(Continued)

(52) U.S. Cl.
CPC .......... *H04L 67/108* (2013.01); *H04L 67/104* (2013.01); *H04L 67/1091* (2013.01);
(Continued)

(58) Field of Classification Search
CPC . H04L 67/108; H04L 67/104; H04L 67/1091; H04N 21/4122; H04N 21/4307; H04N 21/632
See application file for complete search history.

(56) References Cited

U.S. PATENT DOCUMENTS

2004/0047350 A1\* 3/2004 Zhang ................. H04L 45/04
    370/392
2007/0294422 A1\* 12/2007 Zuckerman ....... H04L 29/08333
    709/230

(Continued)

FOREIGN PATENT DOCUMENTS

| KR | 10-2010-0123146 | 11/2010 |
| KR | 10-2010-0123154 | 11/2010 |
| KR | 10-2012-0068314 | 6/2012 |

OTHER PUBLICATIONS

"A proposed method for content distribution within predefined time constraint"; International Telecommunication Union (ITU); Study Period 2017-2020, SG11-C.n, Study Group 11, Nov. 8-17, 2017, pp. 1-5.

*Primary Examiner* — Nasser M Goodarzi
*Assistant Examiner* — Adil Ocak
(74) *Attorney, Agent, or Firm* — Kile Park Reed & Houtteman PLLC (57) ABSTRACT

Disclosed is a display device connection method for rapidly delivering data to a plurality of display devices. A peer-to-peer (P2P) overlay network including the plurality of display devices as member peers is configured to distribute content. In this case, an overlay management server (OMS) connects first member peers through a network as a tree topology using a source peer providing the content as a root node, and transmits fragments of the content to a child peer based on a number of peers to which each of the member peers is capable of transmitting the fragments of the content for a (Continued)

preset period of time, and the source peer directly transmits the fragments of the content to a second member peer that is not included in the tree topology among the member peers based on a predetermined limit on a hop count.

11 Claims, 5 Drawing Sheets

(51) Int. Cl.
  *H04N 21/41* (2011.01)
  *H04N 21/43* (2011.01)
(52) U.S. Cl.
  CPC ..... *H04N 21/4122* (2013.01); *H04N 21/4307* (2013.01); *H04N 21/632* (2013.01)

(56) References Cited

U.S. PATENT DOCUMENTS

| | | | |
|---|---|---|---|
| 2009/0164576 A1* | 6/2009 | Noh | H04N 21/4331 709/204 |
| 2010/0138494 A1 | 6/2010 | Lee et al. | |
| 2015/0312953 A1* | 10/2015 | Wang | H04L 1/00 370/312 |
| 2016/0197731 A1 | 7/2016 | Hyun et al. | |

* cited by examiner

Sort all peers in descending order prevN$_{1HOP}$ = 0;

N$_{1HOP}$ - 1;

findProperNumber = false;

do while (findProperNumber == true)

if N$_{1HOP}$ == N$_{TOT}$ break;

end if

N$_{PFRAG}$=N$_{TOTFLAG}$/ N$_{1HOP}$;

select top N$_{1HOP}$ peers from the sorted list.

for every peer in the selection

Calculate N$_{CHILDREN}$;

end for if the lowest N$_{CHILDREN}$ >= N$_{1HOP}$ - 1 prevN$_{1HOP}$ = N$_{1HOP}$;

N$_{1HOP}$ = N$_{1HOP}$ + 1;

else if prevN$_{1HOP}$ == 0

SRC covers all peers directly;

else

N$_{1HOP}$ = prevN$_{1HOP}$;

Calculate N$_{CHILDREN}$ w.r.t N$_{1HOP}$;

findProperNumner = true;

end if end if end do

Organize the overlay network in tree topology with the lowest N$_{CHILDREN}$ peers;

Organize client-server connection with (N$_{TOT}$ - N$_{CHILDREN}$) peers;

DISPLAY DEVICE CONNECTION METHOD FOR RAPIDLY DELIVERING DATA TO PLURALITY OF DISPLAY DEVICES

CROSS-REFERENCE TO RELATED APPLICATION(S)

This application claims the priority benefit of Korean Patent Application No. 10-2017-0137734 filed on Oct. 23, 2017, and Korean Patent Application No. 10-2018-0117728 filed on Oct. 2, 2018 in the Korean Intellectual Property Office, the disclosure of which is incorporated herein by reference for all purposes.

BACKGROUND

1. Field

One or more example embodiments relate to technology for connecting a plurality of display devices, so that media data is rapidly delivered to the plurality of display devices within a limited period of time, to display same content on the plurality of display devices.

2. Description of Related Art

To display same play media (hereinafter, also referred to as "content") on a plurality of display devices, the plurality of display devices needs to receive an infinitely reproducible play media file. A real-time transmission and play technology, such as streaming, and a technology for transmitting a play media file in advance through a download and timely playing the play media file may be used for receiving and displaying the play media file. Both real-time transmission and advance transmission technologies require the plurality of display devices to be connected by a predetermined network to be capable of processing the same play media file.

Technology for displaying the same play media on the plurality of display devices is used in various fields of application, for example, the field of digital signage services. In a digital signage service, a plurality of display devices almost simultaneously displays the same play media provided from a content provider.

Currently, peer-to-peer (P2P) type networks are being widely used to support content services for distributing content to a plurality of recipients. A P2P network is a distributed network that enables a plurality of individual terminals called peers to directly connect to each other and to distribute content by mutually transmitting and receiving the content, instead of receiving the content from a specific server. Thus, a single peer functions as a client receiving the content and simultaneously functions as a server providing the content. Also, a P2P network is not configured based on a specific server and forms a delivery channel, that is, an overlay network according to an algorithm that is configured based on the content to be shared. Thus, a connection between peers may be flexible and network size may be flexible.

For distributing a plurality of pieces of content to the distributed terminals, for example, through a digital signage service, transmitting the content through a P2P network using a division multipath parallel transmission method may provide increased transmission efficiency and save distribution time and cost. According to this method, when a plurality of terminals subscribes to a single content delivery channel, the terminals may reduce a transmission load of a content server and improve a transmission rate by sharing the content. P2P-based distributed content delivery schemes may include, for example, a BitTorrent scheme and a distributed content delivery scheme in a managed P2P network defined in the International Telecommunication Union Telecommunication (ITU-T) X.609 series. The two methods differ in terms of using a separate torrent file or a server such as an index server.

In an existing P2P-based distributed content delivery method as described above, a single overlay network is configured to distribute a single piece of content. Thus, an amount of time used to distribute specific content to all peers may vary based on a configuration of the overlay network and a path through which the content is delivered to each of peers in the overlay network. In detail, when all peers functioning as digital signage terminals, such as those in a digital signage service, are required to rapidly distribute content within a limited period of time, it is very important to determine the configuration of the overlay network and to determine a scheme used to distribute the content between peers in the overlay network.

SUMMARY

At least one example embodiment provides a display device connection method that may rapidly deliver content to a plurality of display devices within a limited period of time and a content distribution method using the same.

At least one example embodiment also provides a display device connection method that may certainly deliver content to all of a plurality of display devices within a preset period of time and a content distribution method using the same.

According to an aspect of at least one example embodiment, there is provided a display device connection method for rapidly delivering data to a plurality of display devices, the method including: configuring a peer-to-peer (P2P) overlay network including the plurality of display devices as member peers to distribute content; connecting, by an overlay management server (OMS), first member peers through a network as a tree topology that uses a source peer providing the content as a root node, and transmitting fragments of the content to a child peer based on a number of peers to which each of the member peers is capable of transmitting the fragments of the content for a preset period of time; and directly transmitting, by the source peer, the fragments of the content to a second member peer that is not included in the tree topology among the member peers based on a predetermined limit on a hop count.

The first member peer may transmit the fragments of the content to a sibling peer.

The OMS may calculate the number of peers for each of the member peers based on the assumption that each of the member peers receives the fragments of the content from the source peer.

The number of peers for a member peer i may be calculated according to the following Equation 1:

$$\text{a number of peers } (N_{CHILDREN}) = (T_{CONST} - T_{ELAPSED})/T_{TOT}.$$

Here, $T_{CONST}$ denotes a required transmission time, $T_{ELAPSED}$ denotes an amount of time used to transmit the fragments of the content from the source peer to the member peer i, and $T_{TOT}$ denotes a total required time for sending fragments from the member peer i to all its children.

The $T_{TOT}$ is calculated according to the following Equation 2:

$$T_{TOT} = N_{PFRAG} * T_{SEND}, \text{ and}$$

$$T_{SEND} = S_{FRAG}/U.$$

Here, $N_{PFRAG}$ denotes a total number of fragment that a peer or the member peer i needs to send, $S_{FRAG}$ denotes a size of the fragments of the content to be distributed, and U denotes an available uplink capacity of the member peer i.

The hop count may be determined based on that the content is transmitted to all the member peers within a required transmission time.

According to another aspect of at least one example embodiment, there is provided a display device connection method for rapidly delivering data to a plurality of display devices, the method including: configuring, by an overlay management server (OMS), a peer-to-peer (P2P) overlay network including the plurality of display devices as member peers to distribute content; calculating a number of peers to which each of the member peers is capable of transmitting the fragments of the content for a preset period of time; generating a tree topology that uses a source peer as a root node and includes first member peers that are all of or a portion of the member peers based on the number of peers, and connecting the first member peers in the tree topology; and directly connecting a second member peer that is not included in the tree topology among the member peers to the source peer. The first member peers included in a same tier are connected to each other in the tree topology.

The generating may include generating the tree topology based on a hop count that is determined based on that the content is transmitted to all the member peers within a required transmission time.

The calculating may include calculating the number of peers based on the assumption that each of the member peers receives the fragments of the content from the source peer.

The number of peers for a member peer i may be calculated according to the following Equation 3:

$$\text{a number of peers } (N_{CHILDREN}) = (T_{CONST} - T_{ELAPSED})/T_{TOT}.$$

Here, $T_{CONST}$ denotes a required transmission time, $T_{ELAPSED}$ denotes an amount of time used to transmit the fragments of the content from the source peer to the member peer i, and $T_{TOT}$ denotes a total required time for sending fragments from the member peer i to all its children.

The $T_{TOT}$ is calculated according to the following Equation 4:

$$T_{TOT} = N_{PFRAG} * T_{SEND}, \text{ and}$$

$$T_{SEND} = S_{FRAG}/U.$$

Here, $N_{PFRAG}$ denotes a total number of fragment that a peer or the member peer i needs to send, $S_{FRAG}$ denotes a size of the fragments of the content to be distributed, and U denotes an available uplink capacity of the member peer i.

According to some example embodiments, it is possible to rapidly distribute content in a limited period of time since a tree topology and a mesh topology are included together, and also the content is distributed by configuring an overlay network based on an available uplink capacity and a required transmission time for each of peers.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The singular expression, such as "a," "an," and "the", is intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In a specific service scenario, content is required to be distributed within a limited period of time. For example, a specific announcement, such as an emergency alert, needs to be distributed to a specific target device, for example, a display device, such as a digital signage, and to be rapidly displayed. To distribute content through a mobile peer-to-peer (MP2P) communication, peers need to be included in an overlay network with an appropriate configuration. The overlay network may be configured based on a goal that is a time limit specified by a service provider, for example, a provider, and information about peers.

The following example embodiments may be applied to a display device connection method for rapidly delivering data to a plurality of display devices within a limited period of time, and more particularly, to technology for connecting a plurality of display devices for a content distribution using a peer-to-peer (P2P) scheme. Here, the following three requirements need to be satisfied. The plurality of display devices may be connected by newly configuring an overlay network or using an existing overlay network. However, the requirements are simply provided only to describe an operation of each of constituent elements applicable to a method of configuring a P2P overlay network and a content distribution method using the same and to emphasize an effect of example embodiments. Thus, the example embodiments may be applied to a service and an application that may not satisfy all of the requirements. Also, a "rapid distribution of content within a limited period of time" defined in the requirements is a relative concept. Therefore, it is obvious to those skilled in the art that an absolute value thereof may change based on a type of a service and an application, a quality of service (QoS), an application condition thereof, and the like. The three requirements are provided as follows. Hereinafter, an operation of constituent elements, for example, a server and peers, based on each of the requirements and a procedure thereof will be further described.

1. A provider requests a rapid distribution of specific content.
2. The corresponding request is delivered to peers of a P2P network.
3. The peers rapidly receive and share the corresponding content.

Hereinafter, the requirement regarding a rapid content distribution request from a provider will be described.

Figure 1:
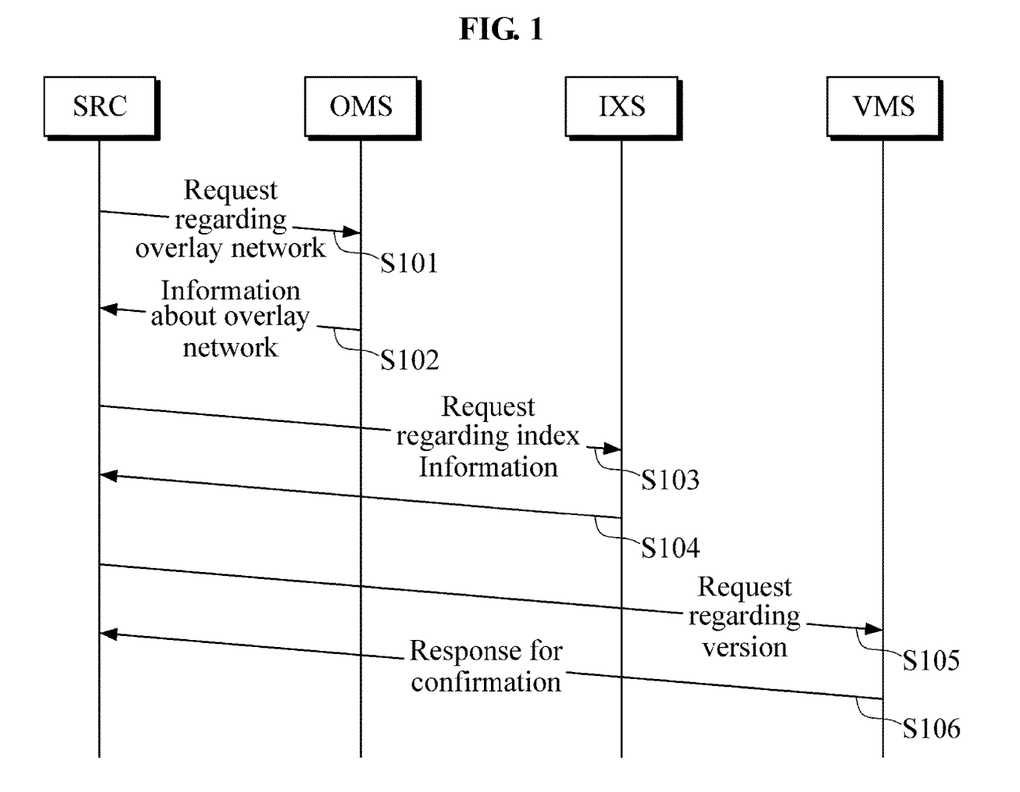
FIG. 1 illustrates an example of a process of delivering, by a server end included in an overlay network, a content distribution request from a provider to member peers according to an example embodiment.

FIG. 1 illustrates an example of a process of delivering, by a server end included in an overlay network, a content distribution request from a provider to member peers according to an example embodiment. Referring to FIG. 1, in the process, a source initiates a content distribution. Although not illustrated herein, to initiate the content distribution, the provider uploads, to an index server, an index file of content to be directly distributed or distributed through a source (SRC). The index file may include information about addresses of an overlay management server (OMS) and a virtual management server (VMS), an overlay network identification (ID), a structure of directory, a file list, a fragment list, and hash values for each file. However, it is provided as an example only.

Referring to FIG. 1, in operation S101, the SRC may connect to the OMS and request the OMS to set a new overlay network. If an existing overlay network is used, the SRC may request a modification and a change of the existing overlay network. Such a request may include a list of target peers to be included in the overlay network, authentication information, and the like. That is, in operation S101, the SRC may request the OMS to newly configure the overlay network and register the overlay network or to modify the existing overlay network by including the list of target peers in the request and transmitting the request to the OMS.

In operation S102, the OMS may transmit a confirmation message to the SRC in response to the request. The confirmation message may include information about the overlay network newly set or changed/modified. For example, when the request in operation S101 relates to newly setting the overlay network, the confirmation message may include information about the newly set overlay network, such as an overlay ID.

In operations S103 and S104, the SRC may set index information about the new overlay network by communicating with an index server (IXS) or modify existing index information. A request from the SRC in operation S103 may include a title of content, the overlay ID, and the like. Accordingly, the index information may include technology suitable for the content.

In operation S105, the SRC may request the VMS to perform a version management. For example, in operation S105, the SRC may notify the VMS of a new registration or a version update of overlay network information so that each of peers included in the overlay network acquires the overlay network information newly registered or of which a version is updated. In operation S106, the VMS may transmit a confirmation message to the SRC.

Hereinafter, the requirement of delivering a corresponding request to peers will be described.

Figure 2:
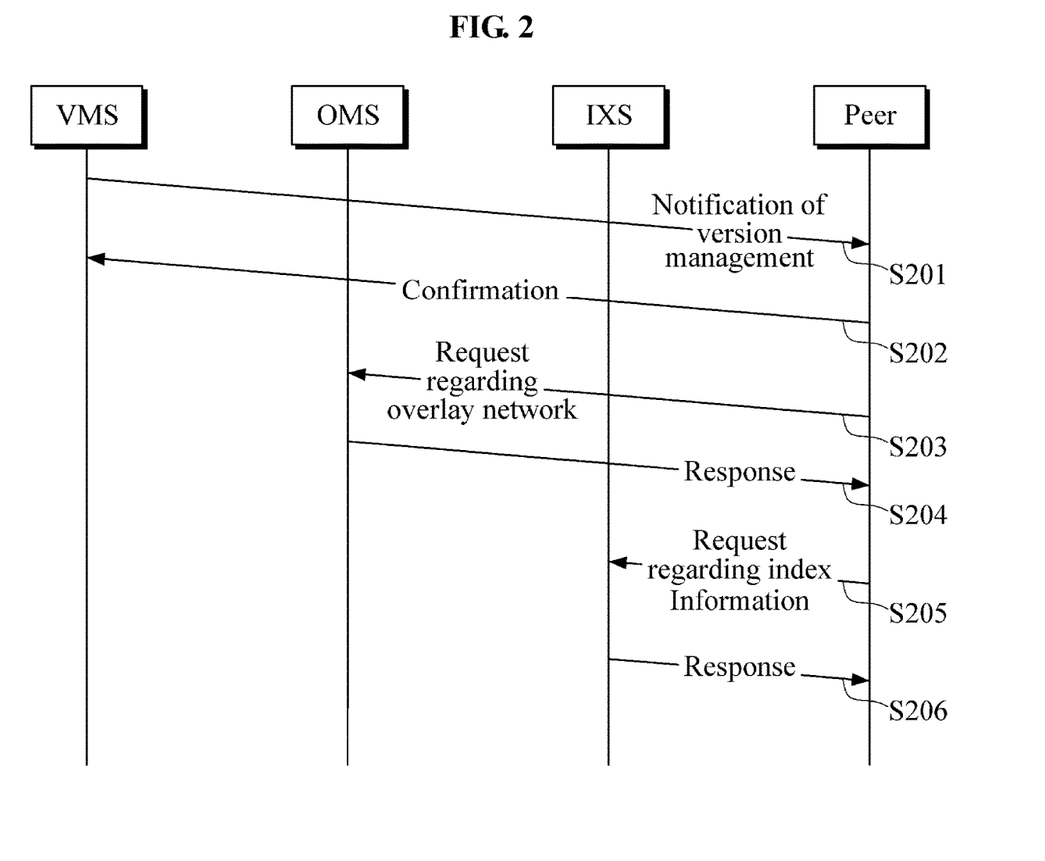
FIG. 2 illustrates an example of a process of delivering a content distribution request from a provider to peers included in an overlay network according to an example embodiment.

FIG. 2 illustrates an example of a process of delivering a content distribution request from a provider to peers included in an overlay network according to an example embodiment. Through the process, the peers may be notified of a participation in the content distribution.

Referring to FIG. 2, in operation S201, the VMS receiving the request from the SRC in operation S105 of FIG. 1 may notify each of the peers included in the overlay network of a version management. The notification process may include notifying each of the peers of a new registration or a version update of overlay network information so that the VMS acquires the overlay network information newly registered or of which a version is updated. In operation S202, in response thereto, a peer may transmit a response message or a reception confirmation message to the VMS.

Accordingly, the peer may recognize that content distributed through the overlay network is changed. Here, the change of the content may indicate an addition of new content or a deletion and modification of existing content. The notification in operation S201 may indicate that a combination with the overlay network included in the notification is required.

In operation S203, the peer may request the OMS to send the overlay network information in any case. The information requested by the peer may include a list of peers included in the corresponding overlay network. In operation S204, the OMS may provide the information requested in operation S203 to the corresponding peer. In operations S205 and S206, the peer may also communicate with the IXS to acquire index information. The peer may connect to other peers for the content distribution using the information acquired from the OMS and may communicate with the other peers.

Hereinafter, the requirement that peers rapidly share content will be described.

According to an example embodiment, a display device connection method for rapidly delivering data to a plurality of display devices may configure a P2P overlay network including the plurality of display devices as member peers to distribute content, which is associated with configuring an overlay network to distribute content between peers within a predetermined limited period of time. For peers included in an overlay network that is newly registered or of which a version is updated to rapidly share the corresponding content, it is important to determine a configuration of the overlay network. Further, it is also important to determine an interaction target of each of peers in the configured overlay network and an algorithm and a P2P scheme used to distribute or share the content. Thus, they are not separate issues and may affect each other since distributing or sharing the content between the peers through operation of the peers is based on the overlay network of a specific configuration and is closely associated with an overall configuration of the overlay network. Hereinafter, "configuring an overlay network" may include a target with which the peers interact in the configured overlay network and an interaction scheme.

According to an example embodiment, a display device connection method for rapidly delivering data to a plurality of display devices may configure a P2P overlay network including the plurality of display devices as member peers to distribute content. In the case of configuring the P2P overlay network, a predetermined overlay network may be configured based on a tree topology by including member peers that constitute the overlay network. The tree topology includes a source peer as a root node and also include all of or a portion of remaining member peers. Here, a hop count of the tree topology, which is a number of hierarchies of the tree topology, is limited in advance since a number of member peers rapidly increases according to an increase in the hop count of the tree topology, and thus an amount of time used to distribute or share the content with respect to all the member peers included in a lower hierarchy, such as a child peer and a grandchild peer, based on a P2P scheme rapidly increases. Therefore, herein, the overlay network may be configured based on the tree topology and the hop count of the tree topology may be limited in advance so that content is rapidly distributed within a preset period of time. In an application, such as a digital signage service, the hop count may be 2, however, it is provided as an example only. An algorithm of configuring the tree topology will be further described below.

According to an example embodiment, in the case of configuring a tree topology by limiting a hop count based on the above-described criterion, all member peers may be included in the tree topology. Alternatively, depending on example embodiments, a portion of the member peers may not be included in the tree topology. In this case, the overlay network may be configured so that each of the corresponding member peers may not be included in the tree topology and may be directly connected to a source peer. Here, the member peers are not connected to each other. Thus, the member peers directly connected to the source peer may directly receive fragments of content only from the source peer and accordingly, may rapidly receive and share the content.

According to an example embodiment, an algorithm of configuring a tree topology is associated with a connection type of member peers included in an overlay network in the tree topology to transmit or receive fragments of content.

In a general tree topology, a parent peer may transmit fragments of content to only a child peer of the corresponding parent peer. However, in the tree topology according to an example embodiment, each of peers corresponding to a parental generation in the tree topology may transmit fragments of content to each of peers corresponding to a child generation. Thus, a single member peer included in the parental generation transmits the fragments of content to each of all the member peers included in the child generation.

According to an example embodiment, transmission of fragments of content may be performed between sibling peers included in a same generation in a tree topology. Thus, a specific member peer in a corresponding generation may transmit or receive fragments of content to or from each of all member peers include in the corresponding generation. A common pull-based scheme used in a mesh network may be used to transmit and receive the fragments of content between the sibling peers.

In the tree topology of the overlay network constructed as above, only peers included in a first generation may receive fragments of content from the source peer. In this case, each of the peers receives a different fragment of the content. Thus, each of all the peers included in the first generation may transmit a fragment of the content received from the source peer to all other peers included in the overlay network. Accordingly, each of the peers include in the first generation of the overlay network may combine all the received fragments and acquire the entire content.

Hereinafter, an example of an overlay network configuration algorithm will be further described.

To configure an appropriate overlay network including a tree topology, an OMS calculates a number of peers ($N_{1HOP}$) included in a first generation and a number of child peers ($N_{CHILDREN}$) to be included in a next generation by interacting with a peer activity management server (PAMS). To calculate $N_{1HOP}$ and $N_{CHILDREN}$, the OMS may execute an algorithm of FIG. 3. Notations and definitions used in the algorithm of FIG. 3 are shown in Table 1.

TABLE 1

| Notation | Definition |
| --- | --- |
| $T_{CONST}$ | The predefined time constraint. All peers should receive the content within the time. |
| $T_{ELAPSED}$ | The expected elapsed time for content delivery from source to the current peer. |
| $N_{TOT}$ | The total number of peers participating in content distribution. |
| $N_{1HOP}$ | The number of peers that receives fragments from source directly over the overlay network in tree topology. |
| U | The available uplink capacity of a peer. |
| $S_{FRAG}$ | The size of a fragment. |
| $T_{TOTFRAG}$ | The total number of fragments. |
| $T_{SEND}$ | The required time for sending a fragment from peer i to a child peer. $T_{SEND} = S_{FRAG}/U$ |
| $N_{PFRAG}$ | The total number of fragment that a peer needs to send. $N_{PFRAG} = T_{TOTFRAG}/N_{1HOP}$ |
| $T_{TOT}$ | The total required time for sending $N_{PFRAG}$ fragments from peer i to all children. $T_{TOT} = N_{PFRAG} * T_{SEND}$ |
| $N_{CHILDREN}$ | The total number of children that peer i can have. $N_{CHILDREN} = (T_{CONST} - T_{ELAPSED})/T_{TOT}$ |

Figure 3:
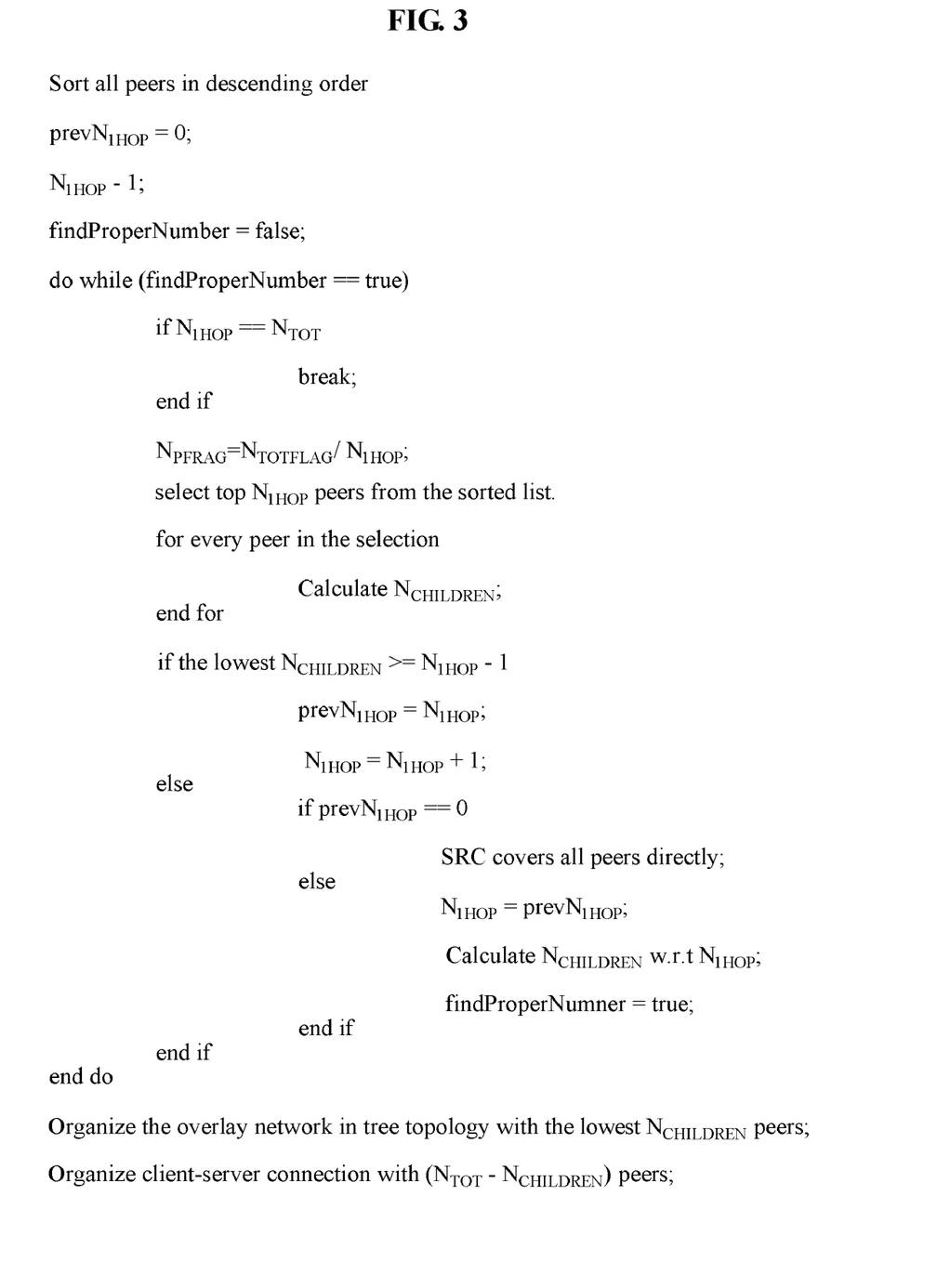
FIG. 3 illustrates an example of an algorithm performed by an overlay management server (OMS) to configure an overlay network according to an example embodiment.

Referring to FIG. 3, the OMS classifies and sorts all peers. For example, a sorting method may use an ascending order method or descending order method, however, is not limited thereto. A classification criterion may be an uplink capacity or an available uplink capacity of each of the peers. The OMS may calculate $N_{CHILDREN}$ denoting the number of child peers that each of the peers may have. The OMS may determine whether to increase $N_{1HOP}$ based on $N_{CHILDREN}$ and $N_{1HOP}-1$. Here, $N_{1HOP}-1$ denotes a value obtained by subtracting 1 from $N_{1HOP}$. Once $N_{CHILDREN}$ and $N_{1HOP}$ are determined, the OMS configures the overlay network with the tree topology. The overlay network includes $N_{1HOP}$ peers having a top value. If lowest $N_{CHILDREN}$ of the top $N_{1HOP}$ peers included in the overlay network is greater than $N_{1HOP}$, ($N_{CHILDREN}-N_{1HOP}$) peers may be additionally included in the overlay network with the tree topology. Accordingly, the overlay network with the tree topology may to be configured to include peers less than or equal to $N_{CHILDREN}$. According to the configuration of the overlay network, additional peers may not receive fragments from a source and may acquire all fragments from $N_{1HOP}$ peers of the first generation. ($N_{TOT}-N_{CHILDREN}$) remaining peers directly acquire all fragments from the source. That is, peers not included in the overlay network with the tree topology directly acquire content from the source.

Hereinafter, another example of an overlay network configuration algorithm will be further described. Here, the undermentioned example is described based on the aforementioned example from a different perspective, and thus may be substantially same as the aforementioned example.

A required transmission time ($T_{CONST}$) denotes a time limit within which a provider or a content provider requires corresponding content to be transmitted to all peers or a required transmission time. An available uplink capacity (U) of a peer denotes a maximum uplink capacity that the peer may support. $S_{FRAG}$ denotes a fragment size of a file to be distributed. An amount of time ($T_{SEND}$) used for the peer i to transmit a fragment with a size of $S_{FRAG}$ may be calculated according to Equation 1.

$$T_{SEND} = S_{FRAG}/U \qquad \text{[Equation 1]}$$

Here, a number of peers ($N_{CHILDREN}$) to which the peer i may transmit the fragment with the size of $S_{FRAG}$ may be calculated according to Equation 2. A number of remaining peers in a same hierarchy or generation is included in $N_{CHILDREN}$ calculated according to Equation 2. That is, the peer i of the specific hierarchy or generation transmits the fragment to $N_{CHILDREN}$ child peers and sibling peers. Here, the sibling peer refers to a peer included in the same hierarchy or generation.

$$N_{CHILDREN} = (T_{CONST} - T_{ELAPSED})/T_{TOT} \qquad \text{[Equation 2]}$$

Here, $T_{ELAPSED}$ denotes an amount of time used to transmit a fragment of content or fragments of content from the source to the peer i. $T_{TOT}$ denotes a total required time for sending fragments from peer i to all its children and it may be calculated according to Equation 3. The source divides all fragments based on the Selected $N_{1HOP}$ and transmit a different fragment to each of first member peers. Accordingly, each of the first member peers may need to exchange a fragment received from the source with those of other first member peers through mutual communication.

$$T_{TOT} = N_{PFRAG} * T_{SEND} \qquad \text{[Equation 3]}$$

To calculate factors according to Equation 1 through 3, it is assumed that the OMS interworks with the PAMS, and all peers receive fragments from the source. The number of peers to which the peer i may transmit the fragment with the size of $S_{FRAG}$, that is, $N_{CHILDREN}$ is calculated. The peers are sorted in ascending order or descending order based on calculated $N_{CHILDREN}$. The OMS calculates a number of peers having a top $N_{CHILDREN}$ and selects top $N_{1HOP}$ number of peers. $N_{1HOP}$ is the number of peers which will receive fragments from the source directly and $N_{1HOP}$ may start from one. OMS finds the maximum value of $N_{1HOP}$. As described above, Once $N_{CHILDREN}$ and $N_{1HOP}$ are determined, the OMS configures the overlay network with the tree topology. Also, as described above, the overlay network is configured so that peers not included in the tree topology may directly receive all fragments of content from the source.

Figure 4:
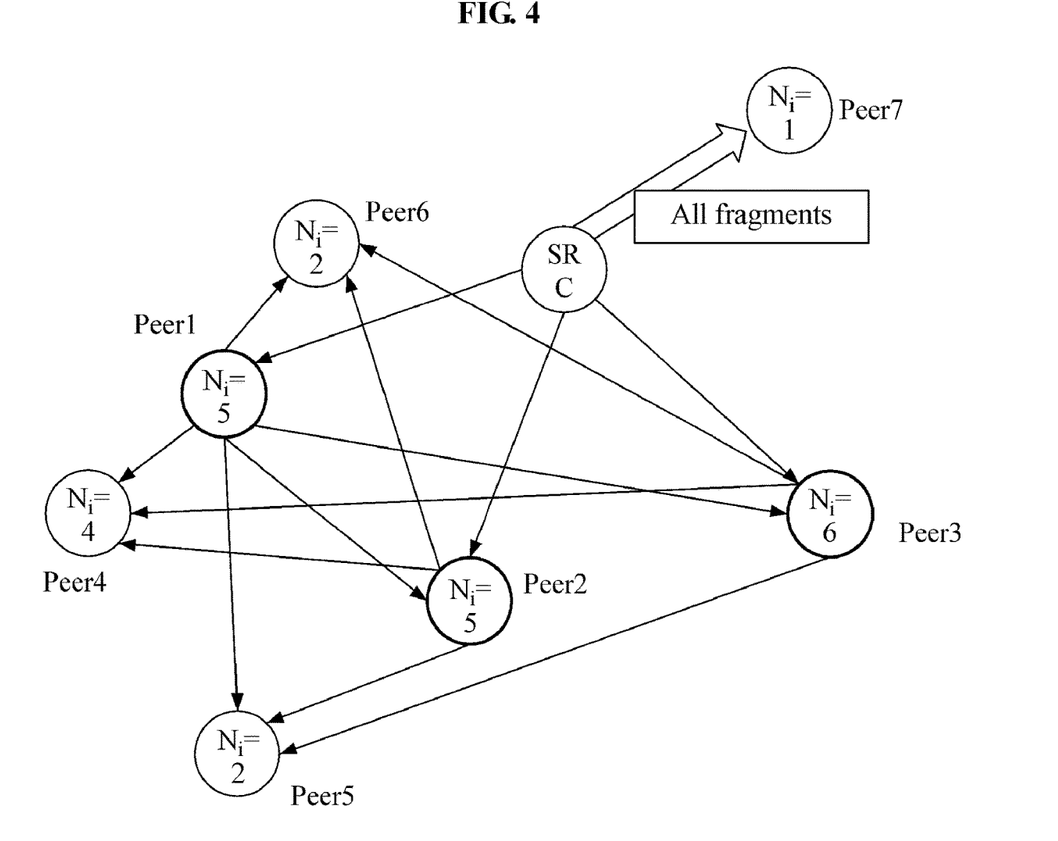
FIG. 4 illustrates an example of a structure of an overlay network configured based on an overlay network configuration algorithm according to an example embodiment.
Figure 5:
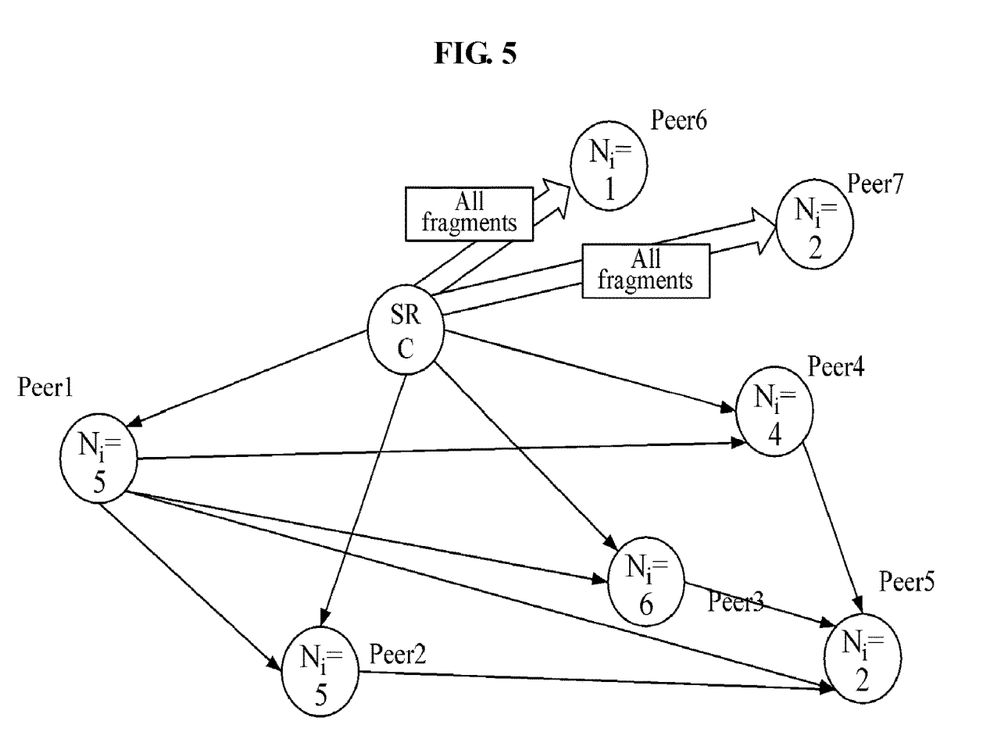
FIG. 5 illustrates another example of a structure of an overlay network configured based on an overlay network configuration algorithm according to an example embodiment.

FIG. 4 illustrates an example of a structure of an overlay network configured based on an overlay network configuration algorithm according to an example embodiment, and FIG. 5 illustrates another example of a structure of an overlay network configured based on an overlay network configuration algorithm according to an example embodiment. To configure the overlay network of FIGS. 4 and 5, the factors may need to be calculated or provided. For convenience of illustration, that a peer 2 and a peer 3 transmit fragments to a peer 1 is not illustrated in FIGS. 4 and 5. FIG. 4 illustrates an example in which three peers including peer 1, peer 2, and peer 3 are provided as a first generation. In this case, a single peer, for example, peer 7, not included in a tree topology directly receives all fragments of content from a source. The peer 1, the peer 2, and the peer 3 receive different fragment(s) from the source. That is, one or more fragments transmitted from the source to the peer 1, one or more fragments transmitted from the source to the peer 2, and one or more fragments transmitted from the source to the peer 3 are different. FIG. 5 illustrates an example in which four peers including peer 1, peer 2, peer 3, and peer 4 are provided as a first generation. In this case, two peers, for example, peer 6 and peer 7, not included in a tree topology may directly receive all fragments of content from a source. The peer 1, the peer 2, the peer 3, and the peer 4 receive different fragment(s) from the source. That is, one or more fragments transmitted from the source to the peer 1, one or more fragments transmitted from the source to the peer 2, one or more fragments transmitted from the source to the peer 3, and one or more fragments transmitted from the source to the peer 4 are different. Comparing the example of FIG. 4 and the example of FIG. 5, load of a server, that is, load of the source may increase.

In a certain service scenario, contents are required to be distributed within time constraint. Specific announcement such as emergency alert, for example, should be distributed to specific target devices like digital signage and played on the screen immediately. To achieve the goal in content distribution over MP2P (managed P2P) communications, peers are required to organize the appropriate overlay network. The organization can be performed based on the goal which is time constraint specified by service provider and the information on peers.

The content distribution in MP2P communications can be achieved with a new overlay network or an existing overlay network. In case of the distribution over an existing overlay network, OMS and IXS may need to modify the information of the overlay network.

A source, noted as SRC, requests OMS to establish a new overlay network for content distribution. When the source wants to use an existing overlay network, it can request OMS to modify the overlay network. The request from the source includes a list of target peers, authentication information, etc. As a response, OMS sends confirmation. If the request was for establishing a new overlay network, the response includes the information of the newly established overlay network such as overlay ID. Then source interacts with IXS in order to establish a new index information or to modify an existing index information. The request includes the title of content, overlay ID, etc., so that the index information has proper description about the content. After all preparation is done, the source requests UMS to conduct session management.

The change of version can be notified by message exchange with a source peer or other peer. A source peer may send a signalling message indicating version has been changed. Peer 1 may also send a signalling message indicating a new version. Upon receiving the message, peer 2 sends a signalling message requesting the latest index file. Based on the latest index file, peer 2 interacts with OMS to have the latest list of peers participating in the overlay network. With the information obtained from OMS, the peer can interact with other peers for content distribution.

Aforementioned overlay network which is formed to achieve content distribution among peers within predefined time constraint is organized.

When an overlay network is organized, only $N_{1HOP}$ peers will receives fragments of the content. Since each peer receives distinct fragments, all peers send the received fragments to all other peers in the overlay network so that every peer in the overlay network can merge all fragments into the content. In order to minimize the transmission delay, the number of hop for relaying fragment is limited to 2-hop.

In order to organize the appropriate overlay network in tree topology, OMS interacts with PAMS to calculate $N_{1HOP}$ and $N_{CHILDREN}$. To determine the two values, OMS conducts the algorithm shown in FIG. 3. First, OMS sorts all peers in ascending order. The sorting criterion is uplink capacity of each peer. Then OMS calculates $N_{CHILDREN}$ of all peers. Based on the result of comparison between $N_{CHILDREN}$ and ($N_{1HOP}$-1), OMS can decide whether it can increase $N_{1HOP}$. After determining $N_{1HOP}$ and $N_{CHILDREN}$, OMS organizes an overlay network in tree topology. The overlay network includes top $N_{1HOP}$ peers in the sorted list. If the lowest $N_{CHILDREN}$ of the top $N_{1HOP}$ peers is larger than $N_{1HOP}$, the overlay network additionally can include ($N_{CHILDREN}$-$N_{1HOP}$) peers. Consequently, the organized overlay network can accommodate at most $N_{CHILDREN}$ peers. Note that the additional peers will not receive fragments from source but they can get all fragments from the $N_{1HOP}$ peers. The rest ($N_{TOT}$-$N_{CHILDREN}$) peers will get whole fragments from source directly. In other words, peers outside of the overlay network in tree topology will get the content from the source directly.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for content distribution, the method comprising:
configuring an overlay network in a tree topology, the overlay network including a source peer and member peers;
wherein each of first member peers of the member peers receives distinct fragments of the content from the source peer over the overlay network and
wherein a peer that is outside of the overlay network receives whole fragments of the content from the source peer.

2. The method of claim 1, wherein each of the first member peer transmits the fragments of the content to a sibling peer.

3. The method of claim 1, further comprising calculating a number of peers for each of the member peers based on the assumption that each of the member peers receives the fragments of the content from the source peer.

4. The method of claim 3, wherein the number of peers for a member peer i is calculated according to the following Equation 1:

a number of peers $(N_{CHILDREN}) = (T_{CONST} - T_{ELAPSED})/T_{TOT}$, where $T_{CONST}$ denotes a required transmission time, $T_{ELAPSED}$ denotes an amount of time used to transmit the fragments of the content from the source peer to the member peer i, and $T_{TOT}$ denotes a total required time for sending the fragments from the member peer i to all children.

5. The method of claim 4, wherein the $T_{TOT}$ is calculated according to the following Equation 2:

$T_{TOT} = N_{PFRAG} * T_{SEND}$, and $T_{SEND} = S_{FRAG}/U$ where $N_{PFRAG}$ denotes a total number of fragment that the member peer i needs to send, $S_{FRAG}$ denotes a size of the fragments of the content to be distributed, and U denotes an available uplink capacity of the member peer i.

6. The method of claim 1, further comprising determining a hop count based on that the content is transmitted to all the member peers within a required transmission time.

7. A method for content distribution, the method comprising:
configuring, by an overlay management server (OMS), a peer-to-peer (P2P) overlay network including member peers to distribute content;
calculating a number of peers to which each of the member peers is capable of transmitting the fragments of the content for a preset period of time; and
generating a tree topology that uses a source peer as a root node and includes first member peers that are all of or a portion of the member peers based on the number of peers, wherein the first member peers included in a same tier are connected to each other in the tree topology, wherein each of the first member peers receives distinct fragments of the content from the source peer over the overlay network; and wherein a peer that is outside of the overlay network receives whole fragments of the content from the source peer.

8. The method of claim 7, wherein the generating comprises generating the tree topology based on a hop count that is determined based on that the content is transmitted to all the member peers within a required transmission time.

9. The method of claim 7, wherein the calculating comprises calculating the number of peers based on the assumption that each of the member peers receives the fragments of the content from the source peer.

10. The method of claim 9, wherein the number of peers for a member peer i is calculated according to the following Equation 3:

a number of peers $(N_{CHILDREN}) = (T_{CONST} - T_{ELAPSED})/T_{TOT}$, where $T_{CONST}$ denotes a required transmission time, $T_{ELAPSED}$ denotes an amount of time used to transmit the fragments of the content from the source peer to the member peer i, and $T_{TOT}$ denotes a total required time for sending the fragments from the member peer i to all children.

11. The method of claim 10, wherein the $T_{TOT}$ is calculated according to the following Equation 4:

$$T_{TOT} = N_{PFRAG} * T_{SEND}, \text{ and}$$

$$T_{SEND} = S_{FRAG}/U$$

where $N_{PFRAG}$ denotes a total number of fragment that the member peer i needs to send, $S_{FRAG}$ denotes a size of the fragments of the content to be distributed, and U denotes an available uplink capacity of the member peer i.

* * * * *